March 26, 1957    D. A. GARRETT    2,786,589
IMPLEMENT CARRIER

Filed Oct. 5, 1953    3 Sheets-Sheet 1

INVENTOR.
Dwight A. Garrett
BY

March 26, 1957

D. A. GARRETT 2,786,589

IMPLEMENT CARRIER

Filed Oct. 5, 1953

INVENTOR.
Dwight A. Garrett

March 26, 1957 D. A. GARRETT 2,786,589
IMPLEMENT CARRIER
Filed Oct. 5, 1953 3 Sheets-Sheet 3
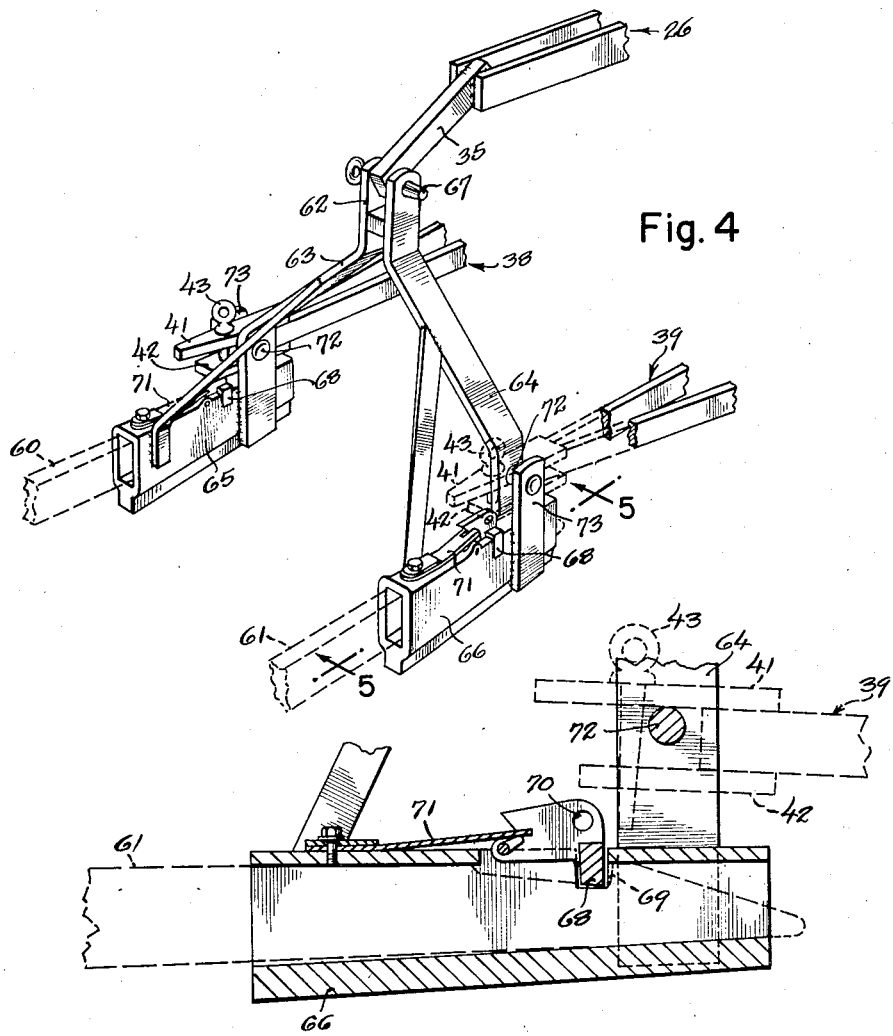
INVENTOR.
Dwight A. Garrett

United States Patent Office 2,786,589
Patented Mar. 26, 1957

2,786,589

IMPLEMENT CARRIER

Dwight A. Garrett, Enumclaw, Wash.

Application October 5, 1953, Serial No. 383,974

6 Claims. (Cl. 214—130)

This invention relates to an implement carrier, and especially a carrier for that type of implement, farm implements in particular, having what is commonly known as a 3-point suspension engineered into the same. The invention has mainly for its objects the provision of a carrier of relatively simple and inexpensive yet sturdy construction to which implements of the described character can be easily and quickly attached and which can be conveniently employed to move said implements expeditiously from one to another site with no liability of damage either to the supported implement or to the road over which the same is carried.

These and other more particular objects and advantages will appear and be understood in the course of the following description and claims, the invention consisting in the novel construction and in the adaptation and combination of parts hereinafter described and claimed.

The invention is illustrated in the accompanying drawings, in which:

Fig. 4 is a fragmentary perspective view portraying a removable attachment which adapts the carrier to prong-type 2-point suspension implements; and Fig. 5 is an enlarged scale section on line 5—5 of Fig. 4.

Figure 1:
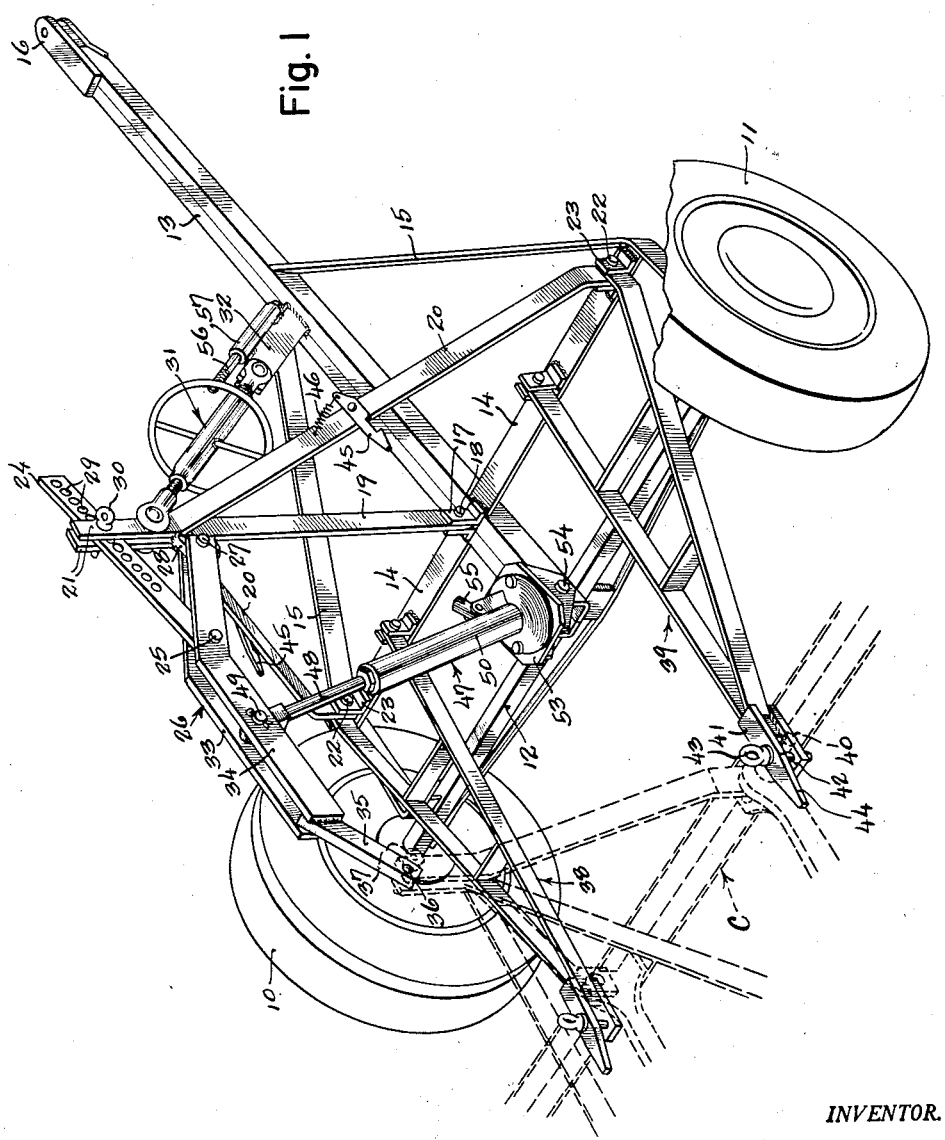
Figure 1 is a perspective view of an implement carrier constructed to embody the preferred teachings of the present invention, with a portion of the rear wheel deleted, and illustrating fragmentarily by dotted lines an implement sustained by the carrier.

The vehicle is in the nature of a trailer having wheels 10 and 11 carried by a dead axle 12, and presenting a reach-pole 13 fabricated by preference from two lengths of channel stock welded face-to-face to produce a box section. The trailer's main frame is completed by bars 14 extending laterally from each side of the reach-pole in forwardly spaced parallel relation to the axle, and outrigger supports 15 carried forwardly from the axle to the outer ends of said bars and thence running diagonally to the reach-pole for bracing the latter. All joints are or may be welded. A hitch fitting 16 is provided at the free front end of the pole so as to enable the trailer to be removably coupled to the draft-bar of a truck or tractor.

Seating upon and welded or otherwise rigidly secured to the reach-pole in the transverse vertical plane occupied by the bars 14 are the spaced complements 17 of a clevis bracket, and received between and pivoted as at 18 to this clevis bracket is a standard 19 stiffened by legs 20 which extend diagonally outwardly from the head end of the standard and have their bottom ends pivoted, as at 22, to clevis brackets 23 sustained by the bars 14 adjacent the outer ends thereof. Upward prolongations 21 of the stiffening legs 20 project in spaced parallel relation beyond the upper limit of the standard so as to produce a furcate extension at the head end of the standard, and received in the slot afforded by this furcate extension is a link 24 pivoted, as at 25, to a rearwardly extending lift arm 26 having its root end pivoted, as at 27, to a lug 28 carried by the standard. The link presents multiple holes 29 located at closely spaced intervals longitudinally thereof, and received in a selected said hole for localizing the lift arm in relation to the standard is a pin 30 traversing the form-arms 21. The standard is adjustably braced by a wheel-type turnbuckle 31 extending diagonally from the head end of the standard to a post 32 surmounting the reach-pole.

Figure 2:
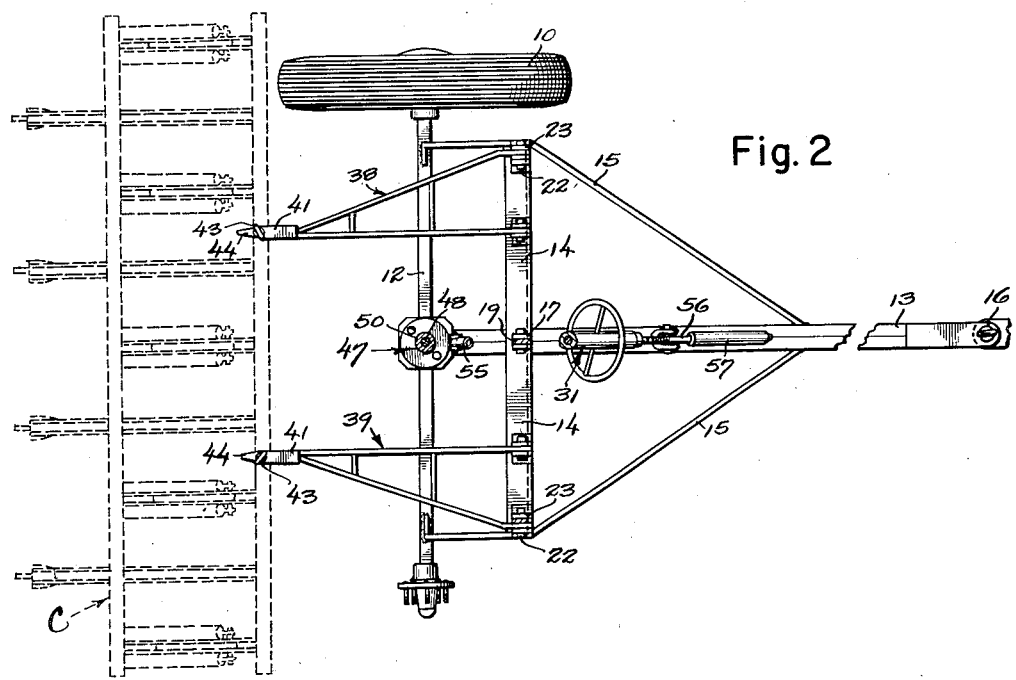
Fig. 2 is a fragmentary horizontal sectional view thereof drawn to a reduced scale on line 2—2 of Fig. 3.
Figure 3:
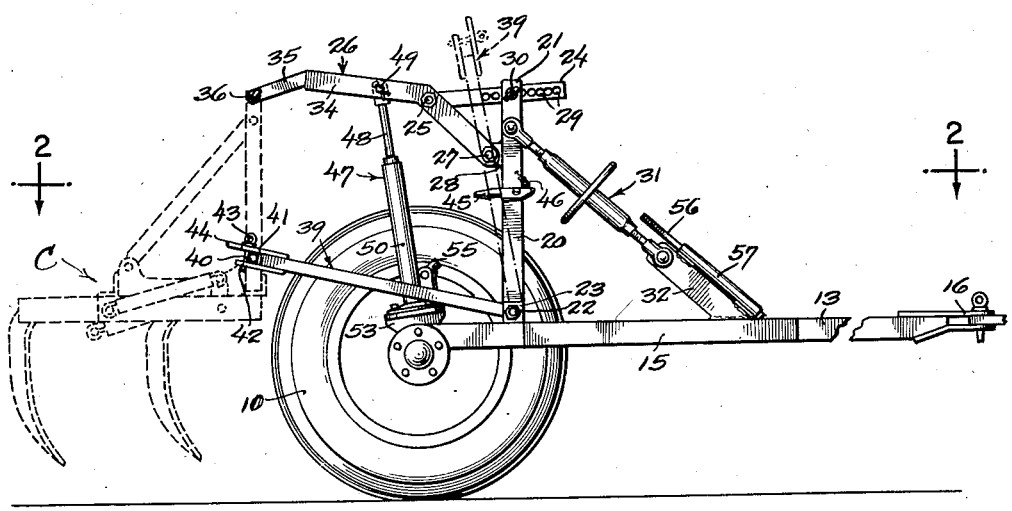
Fig. 3 is a side elevational view, with the right-hand wheel removed in both views.

The lift arm is shown as being fabricated from a pair of parallel spaced bars 33 and 34 prolonged at the free end by a bill 35 which is welded or otherwise made integral with the bars, and formed in the end of the bill is a transverse aperture 36 adapted to accommodate the top horizontal pin 37 of the conventional 3-point suspension favored by a number of farm implement manufacturers. A farm implement having such a suspension is shown by dotted lines in Figs. 1 to 3 and is designated by the letter C, and to engage the implement at the other two points of the 3-point suspension the present invention provides a respective stabilizing arm, as 38 and 39, each mounted for vertical swinging movement about a coinciding transverse horizontal axis and each presenting upon its free end a means to engage the implement. In the most widely used of the 3-point suspensions for farm implements, the two points which complement the pin 37 lie at opposite sides of the top pin 37 in a plane spaced below the latter and most usually are comprised of a respective outwardly directed horizontal stud 40 which is made rigid with the implement frame. The means to engage said studs, as I have elected to illustrate the same, is comprised in each instance of a substantial box cavity defined top and bottom by plates 41 and 42, respectively, welded or otherwise rigidly secured to the stabilizing arms, and open at both sides and to the front with the front opening normally closed by a keeper pin 43 removably received through vertical apertures provided in said plates 41 and 42. The upper plate 41 presents a terminal lip 44 projecting longitudinally beyond the lower plate 42, and the purpose thereof is to provide a guide facilitating the entrance of the studs into said end cavities in which they are adapted to lodge. This is to say that the trailer after having been centered transversely in relation to the implement is backed rather close to the implement and the stabilizing arms lowered so as to each rest upon a related said stud 40, following which the trailer is moved forwardly a distance sufficiene to permit the lower plate 42 to ride over the stud and drop. The lip 44 limits this permitted drop and the trailer can be then again backed up in the moderate degree necessary to introduce the stud in the end cavity of the stabilizing arm. The light weight of the trailer permits the described shifting movements to be performed manually. Pivotally mounted catches 45 carried by the stiffening legs 20 of the standard and yieldingly held in operating position by springs 46 enable the stabilizing arms 38 and 39, when not in use, to be sustained in the vertical position shown by dash-and-dot lines in Fig. 3.

A hydraulic jack 47 provides energy for imparting elevating movement to the lift arm 26, the piston rod 48 of said jack connecting by a pin 49 with the lift rod at a point intermediate the length of the latter, and the cylinder 50 of said jack footing upon a chair 53 pivoted to the reach-pole for rocking movement about the axis of a transverse horizontal pin 54 located immediately above the axle. A pump lever 55 together with the customary pressure-releasing screw (not shown) are provided by the jack, and an operating rod 56 fitting the socket of said pump lever is normally carried in a holster 57 welded to the post 32.

In suspending an implement from the present carrier, having first in the manner above described located the studs and secured the same by the keeper pins to the stabilizing arms, the procedure is to bring the aligned horizontal holes of the implement's top point of suspension into registration with the aperture 36 of the lift arm's terminal bill 35. This is accomplished by withdrawing the pin 30 so as to free the link 24 and then employing the jack or, if it is necessary to raise or lower the bill in only a moderate degree, using the turnbuckle. After obtaining such registration, and inserting the pin 37 through the aligned holes, the jack is activated to elevate the lift arm and raise the suspended implement into carrying position. Turnbuckle 31 should now be turned in the moderate degree necessary to bring one of the multiple holes 29 into registration with the hole of the forked prolongation 21, whereupon the pin 30 is inserted to lock the lift arm to the standard 19 and relieve the jack of the load of the suspended implement. The jack can perforce carry the load should such be desired but the positive lock provided by the pin 30 is desirable in that hydraulic jacks frequently leak and allow oil contained in the cylinder to bleed back to the reservoir.

I proceed now to describe the removable adapter shown in Figs. 4 and 5, and by means of which the present carrier is enabled to carry implements which use a prong-type 2-point suspension rather than the described 3-point suspension. Such 2-point suspension, more particularly, has no upper point of suspension and in lieu of the transverse horizontal studs 40 provides forwardly extending notched prongs 60 and 61. The attachment is in the nature of a harness yoke with a fork 62 being provided at the upper end of converging bridle arms 63 and 64 and with a respective muff, as 65 and 66, provided at the lower end thereof. The fork accommodates the bill 35 of the carrier's lift arm and has its two arms apertured for the reception of a connecting pin 67. The notched prongs of the implement fit in the openings of the muffs and there is provided for each muff a drop catch 68 arranged to lodge behind the notch 69 (Fig. 5) of the related prong. A finger-hole 70 enables the drop catch to be raised out of engagement with the notch against the yielding force of a spring 71. Engagement of the stabilizing arms 38 and 39 with the harness yoke is obtained, at each side of the yoke, by a fixed cross-pin 72 traversing a fork which is described at the lower end of the yoke between the respective bridle arms 63 and 64, as the case may be, and a bar 73 secured to and extending upwardly from the outer face of the related muff. The terminal plates 41 and 42 of the related stabilizing arm are arranged to be received in said fork, one above and the other below the cross-pin 72, and such cross-pin is then locked to the related arm by inserting the keeper pin 43 through the vertical apertures provided by said plates 41 and 42.

It is thought that the invention and the manner of its employment will have been clearly understood from the foregoing detailed description of my now preferred illustrated embodiment. Changes in the details of construction may self-evidently be resorted to without departing from the spirit of the invention, and it is accordingly my intention that the hereto annexed claims be given the broadest interpretation to which the employed language fairly admits.

I claim:

1. A carrier for an implement having a 3-point suspension comprising an upper centrally disposed point of suspension and two lower points of suspension located below said central point at opposite sides thereof, said carrier comprising a trailer vehicle providing a hitch for attaching the same to the draw-bar of a truck and having at the rear end of the trailer a jib mounted for vertical swinging movement in a plane located on the approximate longitudinal median line of the trailer, means on the free end of said jib for detachably connecting the jib with the implement's upper said point of suspension, manually controlled means for raising and lowering said jib, a pair of stablizing arms mounted on the trailer at opposite sides of said jib for vertical swinging movement in planes paralleling the plane occupied by the jib, and means upon the free ends of said stabilizing arms for detachably connecting said arms with the implement's two lower said points of suspension, the transverse spacing between the vertical longitudinal plane occupied by the jib and the paralleling planes occupied by the stabilizing arms being in correspondence with the transverse spacing between longitudinal vertical planes occupied by the implement's upper said point of suspension and the two lower said points of suspension, the trailer providing a frame sustained by a single dead axle, and having a standard carried by said frame and providing at its head end a pivot mounting for the swing movement of the jib, said standard being pivotally mounted for fore-and-aft tilting movement, tie means adjustable as to length extending diagonally forward from the upper end of the standard to the frame of the trailer, the means for raising and lowering the jib comprising a hydraulic jack extending as an adjustable-for-length strut with one end engaging the free end of the jib and the other end engaging the frame of the trailer to the rear of the standard.

2. In a carrier for an implement having a 3-point suspension comprising an upper centrally disposed point of suspension and two lower points of suspension located below said central point at opposite sides thereof, in combination: a trailer vehicle providing a single dead axle and having a centrally disposed reach-pole made an integral part of a frame which includes a cross-member spaced to the front of the axle and braced at the ends by stiffening members which are carried forwardly to the cross-member from outer ends of the axle and thence extend diagonally forward to the reach-pole, transversely aligned clevis brackets secured to the frame at each end of the cross-member, a clevis bracket secured to the frame at the substantial center of said cross-member and transversely aligned with the first-named clevises, a standard pivoted to said last-named clevis and stiffened by diagonal braces pivoted to the first-named clevises, a rearwardly extending jib pivotally attached to the upper end of the standard and provided upon its free end with means for detachably connecting the jib with the implement's upper said point of suspension, a hydraulic jack footing upon the trailer frame at a point spaced to the rear of the standard and having its piston rod connected with the free end of the jib for raising and lowering the jib, a guy adjustable as to length extending diagonally forward to the reach-pole from the upper end of the standard, and a pair of rearwardly extending stabilizing arms located below the jib at opposite sides thereof each pivoted to the trailer frame for vertical swinging movement in a plane paralleling the swing plane of the jib and each provided upon its free end with means for detachably connecting the arm with a respective one of the implement's two lower said points of suspension.

3. The implement carrier of claim 2 in which the means for adjusting the length of the guy comprises a wheeled turnbuckle.

4. An implement carrier according to claim 2 having means independent of the jack for fixing said jib at selected points within the limits of its permitted swing movement.

5. The implement carrier of claim 2 in which the means provided upon the free ends of the stabilizing arms to connect with the implement's two lower points of suspension comprises, in each instance, a horizontal slot open to the rear and having said rear opening normally closed by a removable keeper pin.

6. The implement carrier defined in claim 5 characterized in that the upper wall of the slot is prolonged rearwardly well beyond the lower wall of the slot.

References Cited in the file of this patent

UNITED STATES PATENTS

| | | |
|---|---|---|
| 1,464,740 | Benjamin | Aug. 14, 1923 |
| 1,629,592 | Staley | May 24, 1927 |
| 2,333,837 | Wibbels | Nov. 9, 1943 |
| 2,456,868 | Dominic | Dec. 21, 1948 |
| 2,583,830 | Goble | Jan. 29, 1952 |
| 2,593,176 | Patterson | Apr. 15, 1952 |
| 2,608,924 | Bywater et al. | Sept. 2, 1952 |
| 2,651,858 | Schwindt | Sept. 15, 1953 |
| 2,697,973 | Silver | Dec. 28, 1954 |
| 2,701,510 | Altgelt | Feb. 8, 1955 |